(12) United States Patent
Sutoris et al.

(10) Patent No.: US 6,461,440 B1
(45) Date of Patent: Oct. 8, 2002

(54) APPARATUS HAVING A METALLIC SURFACE PROTECTED FROM UNDESIRED DEPOSITION OF POLYMER

(75) Inventors: Heinz Friedrich Sutoris, Worms; Gerhard Wagenblast, Wachenheim; Jürgen Schröder, Ludwigshafen; Harald Keller, Ludwigshafen; Rainer Rahm, Ludwigshafen; Jürgen Decker, Speyer; Thomas Jaworek, Kallstadt; Volker Schliephake, Schifferstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/540,199

(22) Filed: Mar. 31, 2000

(30) Foreign Application Priority Data

Apr. 1, 1999 (DE) .......................... 199 15 104

(51) Int. Cl.⁷ ................................ C23G 1/00
(52) U.S. Cl. .............. 134/2; 134/4; 134/22.1; 134/22.11; 134/22.12; 134/22.14; 134/22.19; 134/34; 134/36; 134/40; 134/42
(58) Field of Search ............... 134/2, 4, 22.1, 134/22.11, 22.12, 22.14, 22.19, 34, 36, 40, 42

(56) References Cited

U.S. PATENT DOCUMENTS 3,849,179 A * 11/1974 Morningstar ............. 206/524.6
3,962,202 A * 6/1976 Morningstar ................. 526/237
4,093,787 A * 6/1978 Burgess et al. ............. 526/202
4,256,863 A * 3/1981 McOnie et al. ............. 422/131
5,232,603 A * 8/1993 Denzinger et al. .......... 210/698
5,424,377 A   6/1995 Shimizu et al. ............... 526/62
5,432,241 A * 7/1995 Usuki et al. ................... 526/62
5,494,535 A * 2/1996 Keller et al. ................ 148/251
5,747,619 A * 5/1998 Denzinger et al. ........ 526/318.5
6,146,473 A * 11/2000 Shibata et al. .............. 148/251

FOREIGN PATENT DOCUMENTS

| | | |
|---|---|---|
| DE | 196 48 811 | 5/1998 |
| DE | 198 08 179 | 9/1999 |
| EP | 0 606 013 | 7/1994 |

* cited by examiner

Primary Examiner—Sharidan Carrillo
(74) Attorney, Agent, or Firm—Oblon, Spivak, McClelland, Maier & Neustadt, P.C.

(57) ABSTRACT

An article having a metallic surface treated with polymeric complexing agent is described. Particularly suitable polymeric complexing agents are phosphonoalkylated polyethyleneimines and/or carboxyalkylated polyethyleneimines and/or vinylimidazole polymers. As a rule, the treated metallic surface forms the total inner surface or a part of the inner surface of a process apparatus or of a container. The surface is protected by the treatment, in particular from the adhesion of polymer.

9 Claims, No Drawings

APPARATUS HAVING A METALLIC SURFACE PROTECTED FROM UNDESIRED DEPOSITION OF POLYMER

FIELD OF THE INVENTION

The invention relates to an apparatus which has a treated metallic surface and a process for treating the metallic surface and the use thereof.

BACKGROUND OF THE INVENTION

In the storage, preparation, working up or further processing of ethylenically unsaturated monomers, such as styrene, (meth)acrylic acid, (meth)acrylic esters and acrolein, the problem of the formation of deposits due to undesired polymer formation on the walls of the relevant plant components frequently occurs. Such polymer deposits can considerably reduce the heat transport in the relevant plant components, for example to container walls or to cooling means of reactors or distillation apparatuses. Polymer deposits in pipelines, for example in distillation apparatuses, can lead to pressure drops and/or blockages. The undesired polymer formation can finally result in complete polymerization and hence solidification of mixtures containing these monomers. In addition, the undesired polymer formation leads to losses of the relevant polymerizable compound, as a rule a compound capable of free radical polymerization. In syntheses in which polymerizable compounds are used as starting material (for example in the Michael addition), the undesired polymer formation leads to a reduction in the yield.

In order to suppress the undesired polymer formation, soluble polymerization inhibitors are usually used. Such polymerization inhibitors are on the one hand known free radical acceptors, such as phenothiazine or phenols such as pyrogallol, hydroquinone or hydroquinone monomethyl ether, and, on the other hand, the salts of reversibly reducible/oxidizable metal cations, such as the $Cu^+/Cu^{2+}$ pairs.

Soluble polymerization inhibitors have the disadvantage that they cannot completely suppress the polymer formation on the container walls. In the distillation of monomers, high-boiling polymerization inhibitors remain in the vessel, so that the distillate is not protected from polymer formation.

The non-prior-published DE-A-19808179 of Feb. 26, 1998 describes inorganic coatings of process plants which are intended to prevent the adhesion of polymers to the relevant inner surfaces. The coated material contains immobilized metal ions and oxygen compounds of boron, aluminum, silicon or phosphorus.

Another possibility is to protect inner surfaces on which polymers can be deposited from undesired polymer deposition by modification with organic protective coats.

DE-A-196 48 811 describes the use of N-oxyl compounds of secondary amines for reducing the polymeric deposits in the polymerization of vinylically unsaturated compounds. The N-oxyl compounds however can be added to the polymerization mixture or, alternatively, the reactor surface can be wet with N-oxyl compounds before the addition of the polymerization mixture.

EP-B-0 606 013 relates to an inhibitor which is intended to reduce the deposition of polymer on reactor surfaces during the polymerization. It is a low molecular weight condensate of a stilbene compound and a quinone compound, which is applied to the reactor wall before the polymerization in an alkaline solution. After drying, a coating which is intended to provide protection from polymeric deposits during the polymerization forms. The disadvantage of the abovementioned methods for protecting a surface from undesired polymer deposition is that the protective coats produced on the surfaces are resistant only to specific media and moreover the protective coats lose their protective function in the course of time.

BRIEF SUMMARY OF THE INVENTION

It is an object of the present invention to provide an apparatus with which polymerizable compounds, in particular compounds capable of free radical polymerization, e.g. acrylic acid, can be distilled, stored or reacted without polymer being deposited on the walls of the corresponding apparatus during the distillation, storage or reaction. It is intended to bring about this property of the apparatus by means of the material and/or by means of the surface of the apparatus. The material and/or the surface should not only be suitable for protecting plants for chemical processes from the adhesion of polymer but should moreover inhibit free radical polymerization in these plants.

DETAILED DESCRIPTION OF THE INVENTION

We have found that this object is achieved by an apparatus which is in the form of a process apparatus or container and has a metallic surface which contains Fe and/or Mo and/or V and/or Ti and/or Cr and/or Ni and/or Co. In the novel apparatus, at least a part of the metallic surface has been treated with polymeric complexing agent.

The metallic surface is to be understood as meaning the interface of a corresponding article, it also being possible for this interface to be regarded as a three-dimensional structure—the surface is then the uppermost thin layer of a corresponding article (the thickness of the surface is as a rule less than 1 mm). The treated metallic surface generally forms the total inner surface or a part of the inner surface of a process apparatus or of a container. Process apparatuses may be devices, components and apparatuses of all types, such as pipelines, reactors, stirrers, seals or apparatuses for separating substances (for example distillation apparatuses, filter presses, centrifuges). Containers may be, for example, storage containers or receivers.

Polymeric complexing agents are to be understood as meaning compounds whose average molecular weight is at least 1000, preferably from 3000 to 1.5 million, g/mol (number average—method of determination: gel permeation chromatography), which moreover have coordination sites at which heavy metals can be chemically bonded, on average at least 8, preferably at least 12, coordination sites (arithmetic mean) being present per molecule (per polymer). Coordination sites are to be understood as meaning ligands or ligand groups which form coordinate bonds with metal ions under the conditions of use—for example under the conditions of the treatment with polymeric complexing agents, under conditions of storage, chemical synthesis, purification or separation of substances. Coordinate compounds are complexes which have at least one central atom or central ion and at least one ligand or one ligand group (uncharged or negatively charged). In general, heavy metal ions act as central ions. Important examples of coordination sites are functional groups containing bonded oxygen, such as —COOH or —$PO_3H_2$, and furthermore nitrogen-containing functional groups, in particular nitrogen-containing heterocycles having five-membered or six-membered rings.

In particular, it is intended that cations of Fe and/or Mo and/or V and/or Ti and/or Cr and/or Ni and/or Co can be complexed, i.e. bonded by a coordinate bond. In principle, polymeric complexing agents may also be present in the form of salts. Polymeric complexing agents contain branched or straight backbones to which side chains having coordination sites are bonded.

In a preferred embodiment, the polymeric complexing agent contains phosphonoalkylated polyethyleneimines/ polyvinylamines and/or carboxyalkylated polyethyleneimines/polyvinylamines and/or vinylimidazole polymers. The abovementioned groups of substances form basic types of suitable polymeric complexing agents. These basic types are to be described in more detail below.

Carboxyalkylated polyethyleneimines/polyvinylamines:

Carboxyalkylated polyethyleneimines/polyvinylamines are polyethyleneimines/polyvinylamines in which hydrogen atoms of the secondary or corresponding of the primary amino functions have been substituted by radicals which have carboxyl groups. Instead of the carboxyl groups, carboxylates too (deprotonated species) may be present at the corresponding sites, in which case the carboxyalkylated polyethyleneimines/polyvinylamines are present as salts. Polyethyleneimines may contain primary, secondary and/or tertiary amino functions. The primary or secondary amino groups can be completely or partially carboxyalkylated. In contrast to the secondary amino functions, in which of course only the one hydrogen atom can be substituted, in the primary amino functions one or two hydrogen atoms can be substituted. Suitable substituents of the relevant nitrogen atoms are linear or branched alkyl chains to which at least one $COOR^1$ group ($R^1$ is H or a metal ion, in particular Li, Na, K, Rb or Cs) is bonded. In addition to the $COOR^1$ groups, one or more other groups, in particular H, OH or $PO_3R^2R^3$ groups ($R^2$ and $R^3$ are identical or different and are each H or a metal ion, in particular Li, Na, K, Rb or Cs), may also be bonded to these alkyl chains.

Frequently, substituents of the general structure —$(CH_2—)_n COOR^1$, where $R^1$ is H or a metal ion, in particular Li, Na, K, Rb or Cs and n is from 1 to 10, preferably 1 or 2, are bonded to the relevant nitrogen atoms.

Carboxyalkylated polyethyleneimines/polyvinylamines may also have structural units of any desired comonomers, but polyethyleneimines/polyvinylamines contain not more than 70, preferably not more than 50, % by weight of structural units of such comonomers. The nitrogen atoms of the carboxyalkylated polyethyleneimines/polyvinylamines can in principle by completely carboxyalkylated, partially carboxyalkylated (in the case of amino functions, one hydrogen atom is then substituted) and/or uncarboxyalkylated.

The molecular weight of the suitable carboxyalkylated polyethyleneimines/polyvinylamines is as a rule from 1000 to 3,000,000, preferably from 3000 to 1,500,000, g/mol (number average—method of determination: gel permeation chromatography).

Suitable carboxyalkylated polyethyleneimines/polyvinylamines are in particular carboxymethylated and carboxyethylated species.

A possible synthesis route for the preparation of carboxymethylated polyethyleneimines/polyvinylamines is to be described below:

Water-soluble polyethyleneimines/polyvinylamines I having variable molecular weights (as a rule, a number average molecular weight of from 1000 to 3,000,000 g/mol) can be carboxymethylated in the alkaline variant of the Strecker reaction with sodium cyanide and formaldehyde in a one-stage synthesis.

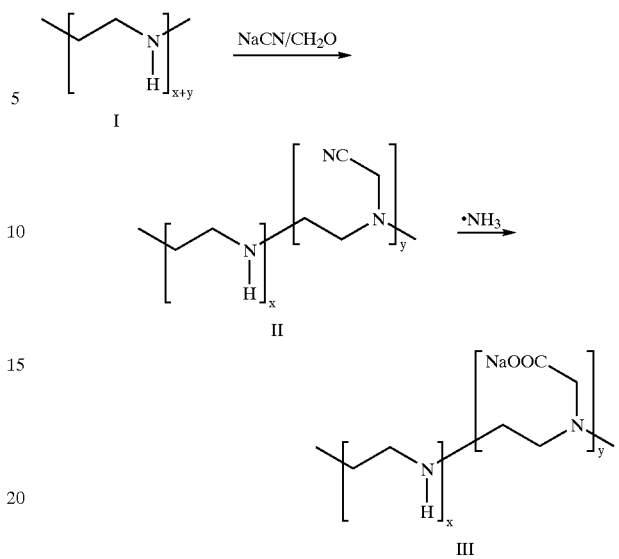

The resulting intermediates II are not isolated but are hydrolyzed at the strongly alkaline pH prevailing in the reaction solution, with elimination of ammonia, directly to the N-carboxyalkylpolyimines III, i.e. carboxyalkylated polyethyleneimines/polyvinylamines present as salt. These polymeric complexing agents may be obtained, for example, as water-soluble sodium salts.

Carboxyethylated species can be prepared by subjecting acrylic acid or acrylic esters to a Michael addition reaction with polyethyleneimines/polyvinylamines, it being possible for ester groups present to be subsequently hydrolyzed.

Particularly suitable carboxyalkylated polyethyleneimines/polyvinylamines are carboxyalkylated polyethyleneimines as such and carboxyalkylated polyvinylamines as such.

Carboxyalkylated polylysines, carboxyalkylated polyallylamines and carboxyalkylated poly-4-aminostyrenes are also to be understood as carboxyalkylated polymeric complexing agents.

Carboxyalkylated polyethyleneimines/polyvinylamines have a high binding capacity for heavy metal ions.

Carboxyalkylated polyethyleneimines/polyvinylamines are preferably used in dissolved and/or dispersed form. The preferred solvent/dispersant is water. Other solvents/dispersants, for example alcohols, are also possible. In the corresponding solutions/dispersions, the carboxyalkylated polyethyleneimines/polyvinylamines are generally present in concentrations of from 0.001 to 70, preferably from 0.1 to 15, % by weight.

Phosphonoalkylated polyethyleneimines/polyvinylamines:

Phosphonoalkylated polyethyleneimines/polyvinylamines are polyethyleneimines/polyvinylamines in which secondary or primary amino functions have been phosphonoalkylated. Phosphonoalkylated polyethyleneimines/polyvinylamines can also be present as salts. Polyethyleneimines may contain primary, secondary and/or tertiary amino functions. The primary or secondary amino groups may be completely or partially carboxyalkylated. In contrast to the secondary amino functions, in which of course only the one hydrogen atom can be substituted, one or two hydrogen atoms can be substituted in the primary amino functions. Suitable substituents of the relevant nitrogen atoms are linear or branched alkyl chains to which at least one $PO_3R^1R^2$ group ($R^1$ and $R^2$ are identical or different and are each H or a metal ion, in particular Li, Na, K, Rb or Cs) is bonded. In addition to the $PO_3R^1R^2$ groups, one or more other groups, in particular H, OH or $COOR^3$ groups (where $R^3$ is H or a metal ion, in particular Li, Na, K, Rb or Cs) may also be bonded to these alkyl chains.

Frequently, radicals of the general structure —$(CH_2—)_nPO_3R^1R^2$ are bounded to the relevant nitrogen atoms. Here, $R^1$ and $R^2$ are identical or different and are each H or a metal ion, in particular Li, Na, K, Rb or Cs, n being from 1 to 10, preferably 1 or 2.

Phosphonoalkylated polyethyleneimines/polyvinylamines may have not only the phosphonoalkylated but also carboxylated primary or secondary amino functions.

Phosphonoalkylated polyethyleneimines/polyvinylamines can also have structural units of any desired comonomers, but polyethyleneimines/polyvinylamines contain not more than 70, preferably not more than 50, % by weight of structural units of such comonomers. Nitrogen atoms which have the phosphonoalkylated polyethyleneimines/polyvinylamines can in principle be completely phosphonoalkylated, partially phosphonoalkylated (in the case of amino functions, one hydrogen atom is then substituted) and/or unphosphonoalkylated.

The molecular weight of the suitable phosphonoalkylated polyethyleneimines/polyvinylamines is as a rule from 1000 to 3,000,000, preferably from 3000 to 1,500,000, g/mol (number average—method of determination: gel permeation chromatography).

Particularly suitable phosphonoalkylated polyethyleneimines/polyvinylamines are phosphonoalkylated polyethyleneimines as such and phosphonoalkylated polyvinylamines as such. Phosphonoalkylated polylysines, phosphonoalkylated polyallylamines and phosphonoalkylated poly-4-aminostyrenes are also to be understood as phosphonoalkylated polymeric complexing agents.

Phosphonoalkylated polyethyleneimines/polyvinylamines have a high bonding capacity for heavy metal ions.

Phosphonoalkylated polyethyleneimines/polyvinylamines are preferably used in dissolved and/or dispersed form. Preferred solvent/dispersant is water. Other solvents/dispersants, for example alcohols, are also possible. In the corresponding solutions/dispersions, the phosphonoalkylated polyethyleneimines/polyvinylamines are generally present in concentrations from 0.001 to 70, preferably from 0.1 to 15, % by weight.

Vinylimidazole polymers:

Vinylimidazole is to be understood as meaning both vinylimidazole as such and substituted vinylimidazoles or vinylimidazole derivatives.

Vinylimidazoles can be described by the following structural formulae:

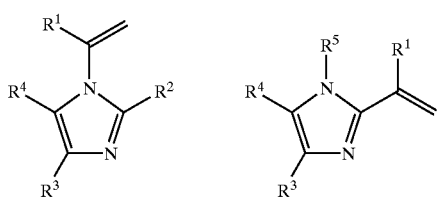

-continued

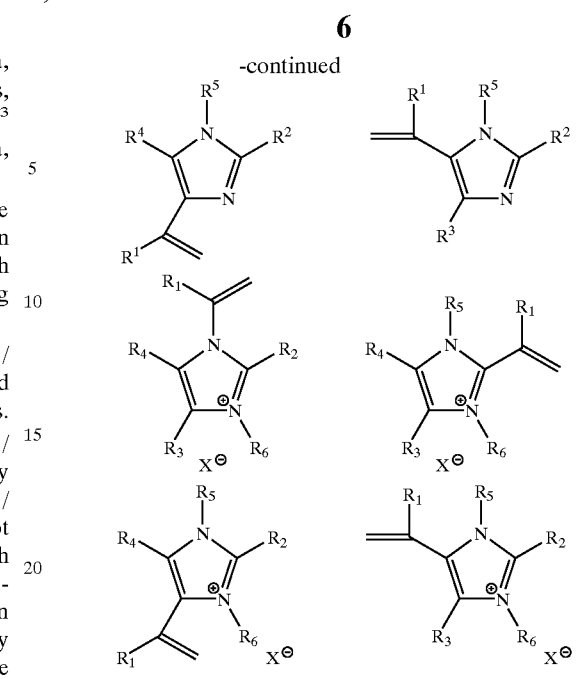

$R_1, R_2, R_3, R_4, R_5$ and $R_6$ may be identical or different and are each hydrogen, branched or straight-chain $C_1$–$C_{12}$-alkyl or —$(CH_2—CH_2—O—)_nH$, where n is from 1 to 6. Vinylimidazoles may also be present as a salt. In this case, an anion $X^−$ is present in addition to the corresponding nitrogen-containing cation, as indicated by the above structural formulae.

$X^−$ is any desired anion, in particular $F^−$, $Cl^−$, $Br^−$, $I^−$, $HSO_4^−$, $O_3SOCH_3^−$; $O_3SOCH_2CH_3^−$, $O_3S$-phenyl$^−$, $O_3S$-4-methylphenyl$^−$, $H_2PO_4^−$, $H_2PO_3^−$, $H_2PO_2^−$, $NO_3^−$ or $NO_2^−$.

Vinylimidazole polymers are homo- or copolymers which have at least 10, preferably at least 50, % by weight, based on the totality of the structural units contained in them, of vinylimidazole units. The other structural units result from comonomers. Vinylimidazole polymers are thus prepared by homo- or copolymerization of vinylimidazoles.

Vinylimidazole polymers which are formed from the homo- or copolymerization of 1-vinylimidazole or of 1-vinyl-3-methylimidazolinium chloride are particularly preferred.

Particularly suitable comonomers are:

1-Vinylimidazole, 1-vinyl-3-methylimidazolinium chloride, N-vinylformamide, vinylamine, allylamine, 4-aminostyrene, vinylpyridine, vinyl acetate, vinyl propionate, acrylic acid, methacrylic acid, maleic acid, vinylphosphonic acid, N-vinylpyrrolidone or vinylcaprolactam.

The number average molecular weight (method of determination: gel permeation chromatography) of the suitable vinylimidazole polymers is from 1000 to 3,000,000, preferably from 3000 to 1,500,000, g/mol. Vinylimidazole polymers have a high bonding capacity for heavy metal ions.

Vinylimidazole polymers are preferably used in dissolved and/or dispersed form. A preferred solvent/dispersant is water. Other solvents/dispersants, for example alcohols, are also possible. In the corresponding solutions/dispersions, the vinylimidazole polymers are generally present in concentrations of from 0.001 to 70, preferably from 0.1 to 15, % by weight.

A substantial advantage of the metallic surfaces treated with polymeric complexing agents is that polymer formation and the adhesion of polymer are inhibited on said surfaces. Metallic surfaces treated with polymeric complexing agents are accordingly protected from the formation and deposition of polymer. In particular, acrylic acid can be distilled in distillation apparatuses whose inner surfaces have been treated with polymeric complexing agents, without the occurrence of deposited polyacrylic acid on the inner walls—without the occurrence of deposited polyacrylic acid or polymer on the inner walls can also mean that comparatively little thereof is deposited. A distillation apparatus formed according to the invention has at least parts of the inner surface which have been treated with polymeric complexing agents.

The surfaces treated with polymeric complexing agents may be completely differently formed. The latter can, for example, be coated with the corresponding polymeric complexing agents or alternatively, for example, may have no coating.

According to the invention, a process for treating metallic surfaces is also provided. This comprises the steps:

a) Providing a clean metallic surface and b) bringing the clean metallic surface into contact with a polymeric complexing agent.

As a rule, a clean metallic surface is provided by cleaning a corresponding surface. For example, a cleaning solution containing surfactants and phosphoric acid may be used, said cleaning solution being removed from the surface with water in a second wash operation. As a rule, the clean metallic surface is brought into contact with a polymeric complexing agent by applying the polymeric complexing agent to the corresponding surface. The polymeric complexing agent can in principle be applied to the clean metallic surface in various ways. One possibility is to apply the polymeric complexing agent to the surface without a solvent, according to the powder coating principle. In a preferred embodiment, however, polymeric complexing agent dispersed and/or dissolved in liquid in used. In practice, it is possible, for example, to immerse a metallic surface in a corresponding solution which contains polymeric complexing agent—alternatively, of course, such a solution can also be sprayed onto the surface. The concentration of polymeric complexing agents in such solutions is as a rule from 0.001 to 70, preferably from 0.1 to 15, % by weight. Depending on the polymeric complexing agent, the solvent or dispersant used may be, in particular, water or an alcohol. The polymeric complexing agent preferably contains phosphonoalkylated polyethyleneimines/polyvinylamines and/or Carboxyalkylated polyethyleneimines/polyvinylamines and/or vinylimidazole polymers. Where the polymeric complexing agent is dispersed and/or dissolved in liquid before being applied to the metallic surface, i.e. is brought in the form of a dispersion and/or solution in liquid into contact with the metallic surface, the liquid is, as a rule, removed from the surface after the application or after contact. This is preferably done by allowing it to run off and/or by drying.

According to the invention, containers and process apparatuses which have a metallic surface which has been treated with polymeric complexing agent by the process described above are used for the preparation, isolation, purification, reaction and/or storage of vinylically unsaturated compounds, ethers, aldehydes, ketones and/or peroxides. The preparation, purification, reaction and/or storage of vinylically unsaturated compounds which are present as acrylic acid or as alkyl acrylates are particularly preferred. The process apparatuses are frequently in the form of distillation apparatuses. Moreover, the metallic surface treated with polymeric complexing agents protects containers and process apparatuses having this treated surface from the following substances or groups of substances: ethers, such as dimethyl ether, diethyl ether, tetrahydrofuran, polytetrahydrofuran, polyethylene glycol and polypropylene glycol; glycols, such as ethylene glycol and propylene glycol; aldehydes, such as acetaldehyde, formaldehyde, glutardialdehyde, acrolein, butyraldehyde and isobutyraldehyde; ketones, such as acetone, methyl ethyl ketone, 3-methyl-2-butanone and mesityl oxide; peroxides, such as hydrogen peroxide, di-tert-butyl peroxide, bibenzoyl peroxide, tert-butyl hydroperoxide, cumyl hydroperoxide and peracetic acid.

In general, the metallic surface treated with polymeric complexing agents protects the material present under the surface from oxidation-sensitive substances.

The Examples which follow illustrate the invention.

COMPARATIVE EXAMPLE

Stainless Steel Nets Which Have Been Only Cleaned

A stainless steel net is immersed in a cleaning solution containing aqueous phosphoric acid and surfactants at room temperature for 15 minutes, then immersed in demineralized water for 15 minutes and then dried at room temperature.

EXAMPLE 1

Treated Stainless Steel Nets

Two stainless steel nets (nets A and B) are immersed in a cleaning solution containing aqueous phosphoric acid and surfactants at room temperature for 15 minutes and then immersed in demineralized water for 15 minutes. Thereafter, the stainless steel nets are immersed for 15 minutes in a solution consisting of 5% by weight of unsubstituted polyvinylimidazole (average molecular weight≅50,000 g/mol–method of determination:light scattering) and 95% by weight of demineralized water and then dried at room temperature.

EXAMPLE 2

Treated Stainless Steel Nets

Two stainless steel nets (nets A and B) are immersed in a cleaning solution containing aqueous phosphoric acid and surfactants at room temperature for 15 minutes and then immersed in demineralized water for 15 minutes. Thereafter, the stainless steel nets are immersed for 15 minutes in a solution consisting of 5% by weight of a copolymer composed of 50% by weight of N-vinylpyrrolidone and 50% by weight of 1-vinyl-3-methylimidazolinium chloride and 95% by weight of demineralized water and then dried at room temperature.

EXAMPLE 3

Treated Stainless Steel Nets

A stainless steel net is immersed in a cleaning solution containing aqueous phosphoric acid and surfactants at room temperature for 15 minutes and then immersed in demineralized water for 15 minutes. Thereafter, the stainless steel net is immersed for 15 minutes in a solution consisting of 5% by weight of carboxymethylated polyethyleneimine (average degree of polymerization=500; number average determined by gel permeation chromatography, about 82% of the nitrogen atoms have been carboxymethylated), whose carboxyl groups are present as sodium carboxylate groups, and 95% by weight of demineralized water and then dried at room temperature.

EXAMPLE 4

Treated Stainless Steel Nets

A stainless steel net is immersed in a cleaning solution containing aqueous phosphoric acid and surfactants at room temperature for 15 minutes and then immersed in demineralized water for 15 minutes. Thereafter, the stainless steel net is immersed for 15 minutes in a solution consisting of 5% by weight of phosphonomethylated polyethyleneimine (average degree of polymerization=500; number average determined by gel permeation chromatography, about 80% of the nitrogen atoms have been phosphonomethylated), whose phosphonate groups are present as sodium phosphonate groups, and 95% by weight of demineralized water and then dried at room temperature.

Test and result of the inhibitory activity

To test, the inhibitory activity—inhibition of the formation and deposition of polymer—the stainless steel nets are introduced into the vapor space of a distillation apparatus in which refluxing acrylic acid is present. The acrylic acid refluxes at a pressure of 0.1 bar and at a boiling point of 90° C. The nets are mounted in the apparatus in such a way that they are in contact both with acrylic acid vapor and with acrylic acid condensate. The amount of polymeric deposits on the nets after a residence time of 7 hours in the refluxing acrylic acid is determined. The Table below shows the results.

| Example | Polymer on the net |
| --- | --- |
| Comparative Example | 1860 mg of polymer |
| Example 1 | |
| Net A | 3.9 mg of polymer |
| Net B | 4.4 mg of polymer |
| Example 2 | |
| Net A | 169 mg of polymer |
| Net B | 133 mg of polymer |
| Example 3 | 9.7 mg of polymer |
| Example 4 | 12.6 mg of polymer |

In all experiments, the following stainless steel nets were used: size 40×20 mm, mesh size 1.6 mm, diameter of the wires 0.5 mm, stainless steel composition in mol %: 0.08 C, 1 Si, 2 Mn, 0.045 P, 0.03 S, 17–19 Cr, 9–12 Ni and 0.4 Ti, remaining amount consisting of Fe.

The results listed in the two Tables above show that the formation and the adhesion of polymer can be substantially reduced by treating the metallic surface with polymeric complexing agents. It is shown that this is achieved by the use of phosphonomethylated polyethyleneimines/polyvinylamines, carboxymethylated polyethyleneimines/polyvinylamines and vinylimidazole polymers as polymeric complexing agents. The inhibition of undesired polymer formation and polymer deposition by providing surfaces treated with polymeric complexing agents is demonstrated.

We claim:

1. A process for treating a metallic surface of an apparatus to protect said metallic surface from the formation and deposition of a polymer wherein the metallic surface contains at least one metal selected from the group consisting of Fe, V, Ti, Cr, Ni and Co, and at least a part of the metallic surface has been treated with a polymeric complexing agent comprising the steps:

a) providing a clean metallic surface and b) contacting the clean metallic surface with the polymeric complexing agent to protect said metallic surface from the formation or deposition of a polymer on said metallic surface, wherein said polymeric complexing agent contains at least a compound selected from the group consisting of phosphonoalkylated polyethyleneimines having a group $PO_3R^1R^2$, where $R^1$ and $R^2$ are identical or different and are each H or a metal ion, phosphonoalkylated polyvinylamines having a group $PO_3R^1R^2$, where $R^1$ and $R^2$ are identical or different and are each H or a metal ion, carboxyalkylated polyethyleneimines and carboxyalkylated polyvinylamines.

2. A process as claimed in claim 1, wherein the metallic surface is cleaned in step (a) by immersing the metallic surface in an aqueous cleaning solution comprising phosphoric acid and surfactants and removing said cleaning solution from the metallic surface with water.

3. A process as claimed in claim 1, wherein said polymeric complexing agent is dispersed or dissolved in a liquid prior to contacting and the liquid is removed from the surface after step (b) has been carried out.

4. The process of claim 1, wherein said polymer is produced from a material selected from the group consisting of vinylically unsaturated monomers, ethers, glycols, aldehydes, ketones and peroxides.

5. The process of claim 1, wherein said polymer is a polymer of a material selected from the group consisting of (meth)acrylic acid and a (meth)acrylic ester.

6. A process for treating a metallic surface of an apparatus from the formation and deposition of a polymer, wherein the metallic surface contains at least one metal selected from the group consisting of Fe, V, Ti, Cr, Ni and Co, and at least a part of the metallic surface has been treated with a polymeric complexing agent comprising the steps:

a) providing a clean metallic surface, and b) contacting the clean metallic surface with the polymeric complexing agent to protect said metallic surface from the formation or deposition of a polymer on said metallic surface, wherein the polymeric complexing agent contains at least one compound selected from the group consisting of phosphonoalkylated polyethyleneimines having a group $PO_3R^1R^2$, where $R^1$ and $R^2$ are identical or different and are each H or a metal ion, phosphonoalkylated polyvinylamines having a group $PO_3R^1R^2$, where $R^1$ and $R^2$ are identical or different and are each H or a metal ion, phosphonoalkylated polylysines having a group $PO_3R^1R^2$, where $R^1$ and $R^2$ are identical or different and are each H or a metal ion, phosphonoalkylated polyallylamines having a group $PO_3R^1R^2$, where $R^1$ and $R^2$ are identical or different and are each H or a metal ion, phosphonoalkylated poly-4-aminostyrenes having a group $PO_3R^1R^2$, where $R^1$ and $R^2$ are identical or different and are each H or a metal ion, carboxyalkylated polyethyleneimines, carboxyalkylated polyvinylamines, carboxyalkylated polylysines, carboxyalkylated polyallylamines, carboxyalkylated poly-4-aminostyrenes, homopolymers of 1-vinyl-3- methylimidazolinium chloride, copolymers of vinylimidazole with a comonomer selected from the group consisting of 1-vinyl-3-methylimidazolinium chloride, N-vinylformamide, vinylamine, allylamine, 4-aminostyrene, vinylpyridine, vinyl acetate, vinyl propionate, acrylic acid, methacrylic acid, maleic acid, vinylphosphonic acid, N-vinylpyrrolidone or vinylcaprolactam and copolymers of 1-vinyl-3-methylimidazolinium chloride with a comonomer selected from the group consisting of N-vinylformamide, vinylamine, allylamine, 4-aminostyrene, vinylpyridine, vinyl acetate, vinyl propionate, acrylic acid, methacrylic acid, maleic acid, vinyl-phosphonic acid, N-vinylpyrrolidone or vinylcaprolactam.

7. A process as claimed in claim 6, wherein said vinylimidazole is represented by one of the following structural formulae:

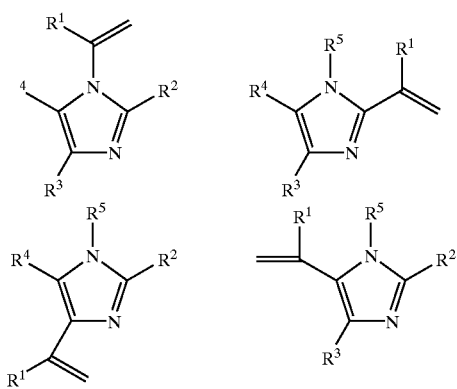

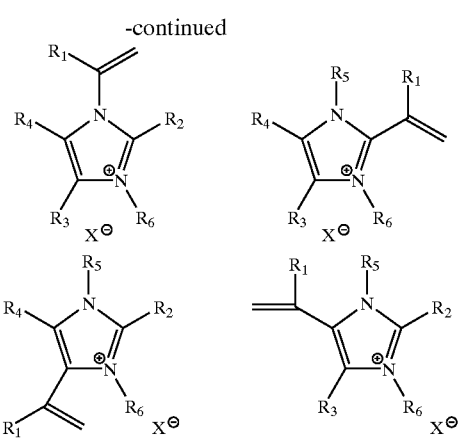

with $R_1$, $R_2$, $R_3$, $R_4$, $R_5$ and $R_6$ being identical or different and being each hydrogen, branched or straight-chain $C_1$–$C_{12}$-alkyl or —(CH$_2$—CH$_2$—O—)$_n$H, where n is from 1 to 6 and $X^-$ being $F^-$, $Cl^-$, $Br^-$, $I^-$, $HSO^-_4$, $^-O_3SOCH_3$, $^-O_3SOCH_2CH_3$, $^-O_3S$-phenyl, $^-O_3S$-4-methylphenyl, $H_2PO_4^-$, $H_2PO_3^-$, $H_2OP_2^-$, $NO^-_3$ or $NO_2^-$.

8. The process of claim 6, wherein said polymer is produced from a material selected from the group consisting of vinylically unsaturated monomers, ethers, glycols, aldehydes, ketones and peroxides.

9. The process of claim 6, wherein said polymer is a polymer of a material selected from the group consisting of (meth)acrylic acid and a (meth)acrylic ester.

* * * * *